United States Patent [19]

Merkl

[11] 4,017,591
[45] Apr. 12, 1977

[54] PROCESS UTILIZING ACTIVATED ALUMINUM AND PRODUCTS PRODUCED THEREBY

[76] Inventor: George G. Merkl, 46 Sunset Court, Haworth, N.J. 07641

[22] Filed: Mar. 8, 1976

[21] Appl. No.: 664,999

Related U.S. Application Data

[63] Continuation-in-part of Ser. No. 389,797, Aug. 20, 1973, abandoned, and a continuation-in-part of Ser. No. 389,998, Aug. 20, 1973, abandoned.

[52] U.S. Cl. .................................. 423/387; 71/54; 252/541; 252/186; 260/414
[51] Int. Cl.$^2$ .......................................... C01B 21/20
[58] Field of Search .......................... 423/113–115, 423/235, 239, 385, 395, 413, 387; 252/152, 186; 260/414; 71/54

[56] References Cited

UNITED STATES PATENTS

| | | | |
|---|---|---|---|
| 2,931,706 | 4/1960 | Gresky et al. | 423/395 |
| 3,119,658 | 1/1964 | Schulz | 423/111 |
| 3,969,387 | 7/1976 | Merkl | 260/414 |

*Primary Examiner*—Earl C. Thomas
*Attorney, Agent, or Firm*—Arnold, White & Durkee

[57] ABSTRACT

Complex aluminum-containing reaction products are produced by a process which comprises:
reactively contacting in an aqueous medium
a. activated aluminum comprising aluminum metal, at least 99.9% by weight pure, which has been permeated with a second metal or alloy selected from mercury, gallium and indium/gallium allows; and
b. a source of $NO_x$, e.g., NO and/or $NO_2$ gas, or nitric acid.

The product of the above reaction, useful as a fertilizer and/or a bleach or soap precursor contains aluinum, nitrogen in the form of NH, $NH_2$, and/or $NH_3$ groups, a minimum of nitrate groups, hydroperoxy groups, and possible minor amounts of nitrite and hydroxy groups. The product is formed as an aqueous solution and appears polymeric in nature.

The aluminum containing reaction product can be further reacted with ammonia to increase the nitrogen content and increase the pH of the reaction product toward neutral and/or with hydrogen peroxide to produce a product which is further enriched with hydroperoxy groups. A product with soap characteristics can be obtained by reacting the complex aluminum-coating reaction product with a saturated fatty acid.

26 Claims, 2 Drawing Figures

PROCESS UTILIZING ACTIVATED ALUMINUM AND PRODUCTS PRODUCED THEREBY

RELATED APPLICATIONS

This application is a continuation-in-part of copending application Ser. No. 389,797 filed Aug. 20, 1973, now abandoned and a continuation-in-part of co-pending application Ser. No. 389,998 filed Aug. 20, 1973, now abandoned.

FIELD OF THE INVENTION

This invention relates to a process for the production of novel aluminum-containing complex products, appearing polymeric in nature and to such products so produced. More particularly, the present invention is directed to the production of such complex products utilizing as a reactant an activated form of aluminum, the complex products having fertilizer and/or detergent properties.

SUMMARY OF THE INVENTION

The present invention relates to a process for the production of certain novel aluminum-containing complex products by reactively contacting in an aqueous medium an activated form of aluminum with a source of $NO_x$, e.g., NO and/or $NO_2$ gas or nitric acid.

The reaction of the present invention is carried out in accordance with the following sequence. The activated aluminum is added to the aqueous reaction medium and the source of $NO_x$ added thereto in an amount to establish a pH in the reaction medium of at least about pH 1.5 at a rate to maintain the temperature of the reaction medium below about 105° F during addition of such source of $NO_x$. As the source of $NO_x$ is consumed in its reaction with the activated form of aluminum, and converted to amine groups, there is an increase in the pH of the aqueous reaction medium. The reaction is continued after addition of the source of $NO_x$ while maintaining the temperature of the reaction medium below the boiling point thereof, and until the specific gravity of the aqueous reaction medium is within the range of about 1.1 to 1.5. The reaction is terminated by withdrawal of any unreacted activated aluminum from the aqueous reaction medium before the specific gravity thereof exceeds about 1.5 and before the pH of the aqueous reaction medium exceeds about pH 4.5.

In accordance with the preferred reaction sequence, initially the activated aluminum is added to the aqueous reaction medium in an amount less than a predetermined stoichiometric amount based upon a final aluminum content in the reaction product of at least about 3 percent by weight, preferably from about 3 to about 7 percent by weight. Thereafter, subsequent to addition of the source of $NO_x$, and, preferably when the pH of the aqueous reaction medium reaches at least about pH 3, additional activated aluminum is added thereto to provide at least a stoichiometric amount of aluminum based on the desired final aluminum content in the reaction product. The activated aluminum is preferably added in excess during this stage of the reaction. The reaction can be easily terminated by withdrawing any unreacted activated aluminum from the aqueous reaction medium.

The activated aluminum utilized in the foregoing process comprises aluminum metal, of a purity of at least about 99.9% by weight, the grain structure of which has been permeated with a liquid metal selected from mercury, gallium and indium/gallium alloys. This activated aluminum is highly reactive when compared with the high purity aluminum itself, the activated form having physical and chemical properties not found in the high purity aluminum prior to activation.

The product of this reaction is formed as an aqueous solution of a complex aluminum-containing inorganic material, appearing polymeric in nature. While certain functional groups have been identified, the precise structure of this polymeric product has not been determined. As a result, the product of the above-described process is referred to hereinafter as merely the "product" or "complex product," these expressions identifying the polymeric product without limitation to any precise structure.

The complex product of the above process can be further modified or enriched in accordance with the invention by reacting the product with ammonia and/or hydrogen peroxide. Reaction with hydrogen peroxide forms a hydroperoxide enriched product. Reaction with ammonia, either with or without previous reaction with hydrogen peroxide, increases the pH of the acidic complex product toward neutral, e.g., to a pH of about 6.5. A still further modified product can be obtained by reacting the complex product with a saturated fatty acid.

The products and complex products of the process of the present invention have utility as fertilizers and/or detergents. For example, the product obtained by contacting and reacting the activated aluminum and the source of $NO_x$ can be effectively utilized as a slow release fertilizer, the fertilizer supplying nitrogen and oxygen to the soil and plants. Additional nitrogen can be supplied through a fertilizer in which the complex product has been further reacted with ammonia. This is particularly important where the plant or plants in question cannot tolerate the acidity level of the original complex product. Further oxygen can be supplied to the soil and plants through the hydroperoxy enriched product obtained by reacting the complex product with hydrogen peroxide.

A particularly effective and convenient way to manufacture the complex product of the present invention is to use as the $NO_x$ source an NO and/or $NO_2$-containing gas stream, such as the stack gas of a nitric acid plant, etc. In this way the atmospheric pollutant can be utilized directly in the production of an effective commercial product.

In connection with the detergent properties of these products, the term "detergent" is used generically herein and signifies that certain of the products and complex products of the process of the present invention have surface active properties. More specifically, these products can be effectively utilized as bleach formulations and/or soap formulations, depending upon the functional groups present in the complex products. For example, because of the oxygen present in the product, mainly as hydroperoxy groups, the complex product obtained by the reaction of the activated form of aluminum and source of $NO_x$ can be utilized by itself as an effective bleach. In addition, the further hydroperoxy enriched product obtained by reacting this product with hydrogen peroxide contains even more active oxygen in the form of hydroperoxy groups, thereby making this material a very effective bleach. Also those complex products obtained through further reaction with a saturated fatty acid have soap characteristics associated with the fatty acid moiety. The combination of hydrogen peroxide and the saturated fatty acid provides a product which has both soap and bleach characteristics.

BRIEF DESCRIPTION OF THE DRAWINGS

In the appended drawings.

DETAILED DESCRIPTION OF THE INVENTION

Figure 1:
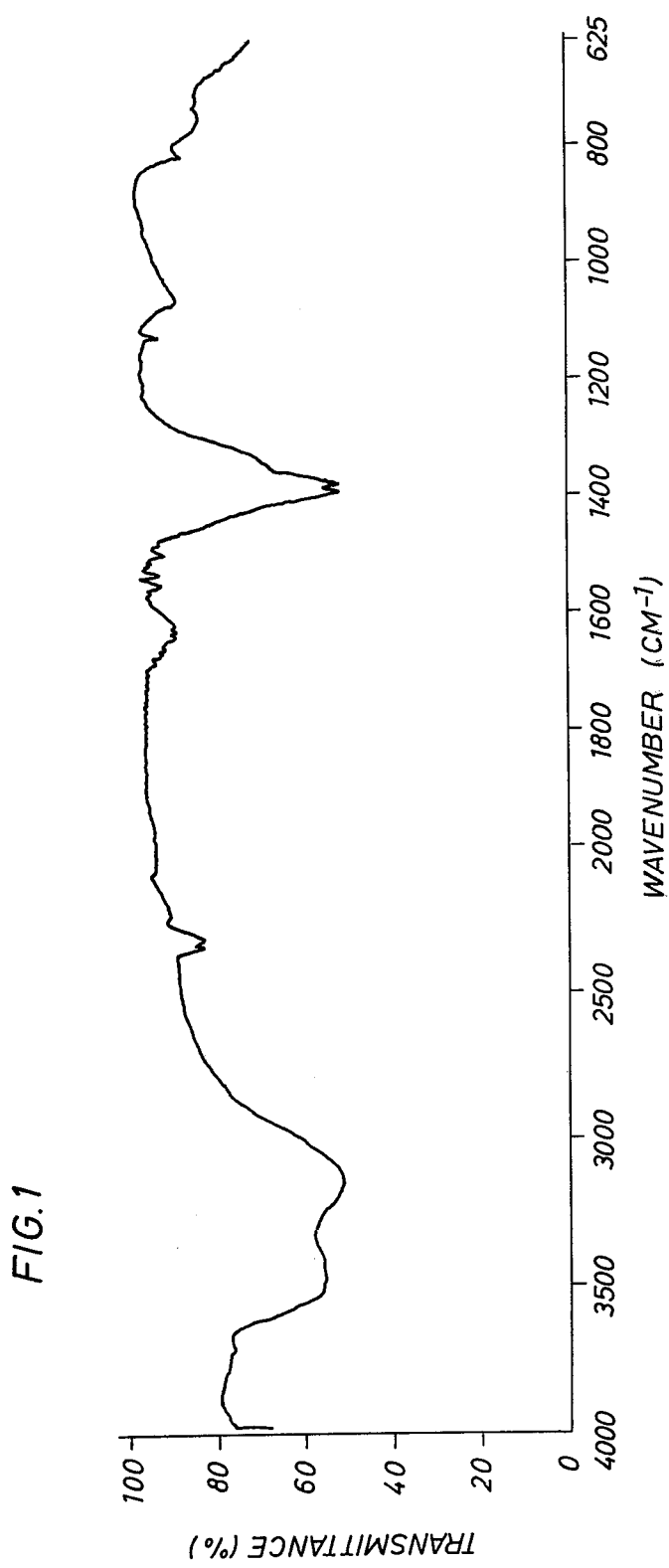
FIG. 1 is an infrared spectrum of a complex product in accordance with the present invention, withdrawn from the reaction system at a pH of about 4.2.

Preparation of Complex Product from Activated Form of Aluminum and Source of $NO_x$ Preparation of Activated Aluminum A key reactant in the preparation of the complex products of the present invention is a first metal, e.g., aluminum metal, which has been activated through permeation by a second metal, i.e., a liquid metal selected from mercury, gallium and indium/gallium alloys. By "activated" is meant that the inter-crystalline structure of the aluminum is made uniquely and exceptionally receptive to chemical reaction. A more thorough description of the aluminum activation technique as well as an explanation of the physiochemical phenomena which occur during activation is contained in co-pending application Ser. No. 497,560, which is hereby incorporated by reference.

Basically, activation of the aluminum is carried out by wetting the surface of the aluminum in the presence of a source of hydrogen ions (protons), such as hydrochloric acid, with a liquid second metal selected from mercury, gallium and indium/gallium alloys until the aluminum has been permeated with the second metal. Evidence has been developed to establish that during this permeation of the aluminum the grain boundaries of the aluminum are actually penetrated by atoms of the second metal. This appears to create a realignment of the aluminum grain boundaries which has the effect of opening up the domains within the aluminum metal, resulting in unique reactivity properties.

The activated aluminum which is utilized in the process of the present invention shows many unique characteristics when compared with the base untreated aluminum metal. One of these is the erosion of the aluminum and release of hydrogen ions or protons when placed in a liquid medium containing a source of hydrogen ions, e.g., water. It is this feature which is taken advantage of in the present invention and which allows for the production of a novel complex products with the activated aluminum.

In preparing the activated aluminum, aluminum metal in the form of relatively small rods or bars, preferably substantially free of bends and twists, is generally utilized. Preferably, soft aluminum metal having a purity of at least 99.9% by weight is used. The use of an aluminum metal with a substantial percentage of impurities is disadvantageous in the present invention in that activation requires substantially longer periods of time. More importantly, there is the tendency for the impurities to enter into and precipitate from the subsequently formed products. Generally, however, the impurities are leached from the aluminum during extended periods of activation.

Using as an example the aluminum-mercury system, activation of the aluminum can be effectively carried out by floating an aluminum bar or rod on mercury in the presence of a hydrogen ion donating medium. This hydrogen ion donating medium can be an aqueous inorganic or organic acid, an aqueous alkaline solution or an alcohol, etc. In principle, any hydrogen ion source or hydrogen ion donating medium can be utilized. It is hypothesized that the mercury is caused to penetrate and diffuse through the aluminum in the form of a stable hydride formed in situ by the reaction between the mercury metal and hydrogen ions of the hydrogen ion donating medium. The ability of mercury, indium and gallium to act in a similar fashion appears to be associated with the hydride-forming capabilities of these metals and the fact that each of these metals has an atomic volume similar to that of hydrogen itself. This allows the metals to penetrate and diffuse through the aluminum either together with hydrogen or in the form of the hydride.

As will be apparent to those skilled in this art, the length of time required for activation of the aluminum with mercury will depend upon many factors, including the exposed surface area, which is related to the hardness of the aluminum, and the amount of impurities present in the aluminum. Longer times are required for harder aluminums and those with greater impurity contents. As a general rule, adequate activation of aluminum rods with mercury can be achieved in a time period of from about two hours to about 24 hours. When utilizing a preferred soft grade of aluminum, activation can be achieved in a period of from 8 to 12 hours.

When the aluminum is activated, it becomes embrittled and can be easily broken, using a snapping action. By breaking the aluminum and examining the grain structure at the break, one can determine the degree to which the mercury has penetrated and diffused throughout the aluminum. In accordance with the preferred embodiment of the present invention, the desired products are prepared utilizing activated aluminum in which the mercury, gallium, or indium/gallium alloy has penetrated and diffused entirely throughout the aluminum structure.

In forming the activated aluminum, high temperatures should be avoided since high temperatures appear to prevent grain structure realignment due to lattice expansion. Generally, the activation of aluminum with mercury can be carried out under ambient temperature conditions, with a temperature in the range or from 40° F to 100° F being preferred. When utilizing gallium as the second metal, it is often desirable to gently heat the gallium in order to maintain the gallium in the liquid state, thereby allowing the permeation to more effectively take place. Here again, however, excessive temperatures should be avoided.

When forming the activated aluminum using gallium or an indium/gallium alloy, the permeation and diffusion of the gallium or indium/gallium through the aluminum rod may be initiated merely by contacting one end of the aluminum rod with the second metal or metals in the presence of the hydrogen ion donating medium. The initiation of diffusion may be observed by noting the surface wetting of the aluminum with the second metal or metals above the point of contact. Further diffusion of the gallium or indium/gallium alloy through the entirety of the aluminum can then be continued by placing the aluminum rod in an anhydrous organic liquid medium such as alcohol, or the like, which is capable of donating hydrogen ions for effecting further diffusion.

With respect to the indium/gallium alloys which may be used, essentially any alloy composition will be suitable, ranging from 90% by weight gallium and 10% by weight indium to 10% by weight gallium and 90% by weight indium. When employing such alloy, however a 50:50 weight mixture of gallium and indium is extremely effective. As the percentage of indium is increased in the indium/gallium alloy, there is an increasing tendency for the activated aluminum to disintegrate, particularly when in an aqueous environment. This does not prevent production of the desired complex products of the present invention, but merely slightly complicates withdrawal of unreacted activated aluminum form the reaction medium.

The amount of mercury, gallium or indium/gallium alloy which penetrates and diffuses through the aluminum will depend, of course, upon the length of treatment, temperature of treatment and the ability of the aluminum to retain the second metal or metals. As previously mentioned, it is preferred in accordance with the present invention to employ an activated aluminum in which the mercury, gallium or indium/gallium alloy has penetrated entirely through the aluminum. Aluminum which has been "totally" activated in this manner erodes with the greatest efficiency under the process conditions of the present invention.

Generally, a soft aluminum will pick up and retain a maximum of about 5% by weight of mercury during the activation process, with typical pickups being in the 2.5 to 3.5% by weight range. This amount of mercury is very effective to achieve the desired results of the present invention. Even with much smaller amounts of mercury, however, e.g., amounts as low as 0.1%, the aluminum becomes activated and can be used to produce the unique products of the present invention. It is preferred, however, to operate with a mercury content within the above specified range of about 2.5% to about 3.5% by weight.

It has generally been found that an aluminum activated with gallium or indium/gallium alloy is more active than the mercury-activated aluminum. For this reason, the amount of gallium or indium/gallium required to achieve suitable activation is less than the amount of mercury required. Generally, the aluminum will pick up and retain a maximum of about 3% by weight gallium or indium/gallium alloy. However, suitable activation can be achieved with as little as about 0.05 to about 1.0% by weight gallium or indium/gallium alloy and it is preferred to utilize an amount in this range. However, it has been found that even with amounts of these metals as low as 0.01% by weight, very active aluminum effective for the process of the present invention can be provided.

Source of $NO_x$

The source of the $NO_x$ used in the process of the present invention can take the form of an NO and/or $NO_2$-containing gas stream or a material such as nitric acid which provides $NO_3$-ions during the reaction. Accordingly the expression, "source of $NO_x$" is meant to embrace the above and equivalent materials. A gas stream containing NO and $NO_2$ is formed, for example, in the production of nitric acid, the $NO_x$ containing gas stream generally being vented to the atmosphere. The venting of the $NO_x$-containing gas stream, however, produces environmental pollution. In accordance with the present invention, such $NO_x$-containing gas stream, such as the stack gas of nitric acid plant, can be efficiently and effectively utilized as the source of $NO_x$ in the process of the present invention.

The preferred source of $NO_x$ is nitric acid, which provides $NO_3$-ions during the reaction. Accordingly, an aqueous solution of nitric acid is preferably used in the process of the present invention. In addition, it is possible, and in some cases desirable, to utilize nitric acid supplemented by an $NO_x$-containing gas.

Reaction Medium

The process of the present invention is preferably carried out by contacting and reacting the activated aluminum and the $NO_x$ source in an aqueous medium, i.e., water. While the use of an aqueous medium is preferred, in effect, any liquid reaction medium which acts as an hydrogen ion source can be utilized. Accordingly, in lieu of the preferred use of water as the reaction medium, the reaction between the source of $NO_x$ and activated aluminum can be carried out in other suitable reaction media, such as organic acids, inorganic acids, saturated aliphatic alcohols or any equivalent source of hydrogen ions, all preferably in dilute aqueous form.

Reaction Parameters

It would ordinarily be expected that the reaction between aluminum and nitric acid at low pH would produce an aluminum nitrate. Note for example U.S. Pat. No. 2,931,706 to Alan T. Gresky, et al. issued April 5, 1960. In addition, such typical reaction between aluminum, specifically highly pure aluminum, and nitric acid is known to be slow. Contrary to this, however, it has been discovered in accordance with the present invention that when utilizing an aluminum which has been activated in the manner described above in accordance with the prescribed reaction system, a totally different reaction occurs, leading to the aluminum-containing complex products of the present invention. Again, it is noted that the activated form of aluminum utilized in the process of the present invention has chemical and physical properties far different from those of the aluminum metal itself, especially as to its activity and reactivity in chemical processes.

It has been determined in accordance with the present invention that the reaction between the activated aluminum and source of $NO_x$ is somewhat dependent upon the temperature maintained in the reaction medium and the pH of the reaction medium. Generally the reaction in accordance with the present invention is initiated by introducing the activated aluminum into water. The source of $NO_x$, e.g., nitric acid or $NO_x$ gas is then added to the water containing the activated aluminum is such a manner as to establish a pH of at least about 1.5 and at such a rate that the temperature of this medium is maintained below about 105° F during addition of the source of $NO_x$. When utilizing an $NO_x$ gas it is generally preferable to initially add some nitric acid to the reaction medium in order to accelerate the reaction. It is important in accordance with the present invention that the pH of the reaction medium not be below about 1.5 since at lower pH values there is an increasing tendency for the production of aluminum nitrate. The nitrate production in accordance with the process of the present invention should be minimized as much as possible in order to produce the complex aluminum-containing product that is desired.

The introduction of the activated form of aluminum into the aqueous medium produces hydrogen ions from the dissociation of the water. These hydrogen ions react with the source of $NO_x$, forming the highly desirable amino groups for formation of the aluminum-containing complex. Where the use of $NO_x$ gas is not initially supplemented by nitric acid, the formation of the amino groups may be extremely slow, thereby greatly reducing the efficiency of the reaction, although the desired aluminum-containing complex will be formed in time.

With respect to temperature, increased temperatures tend to provide increased erosion or dissolution of the activated aluminum, to the point where the reaction becomes too accelerated and $NO_x$, together with hydrogen, may be driven out of the reaction medium before any substantial reaction can effectively occur. For this reason it is preferred in accordance with the present invention that the temperature of the reaction medium be maintained below about 105° F, preferably room temperature or below, during the addition of the source of $NO_x$.

To achieve the pH condition and temperature condition stated above it is preferable in accordance with the present invention to add the source of $NO_x$ incrementally to the reaction medium containing the activated aluminum. Taking nitric acid as an example, if the nitric acid were added at one time to the reaction medium it is probable that the pH would be lowered beyond pH 1.5, thereby creating the disadvantages enumerated above. Accordingly it is preferred to slowly meter the nitric acid into the reaction medium. Of course, when utilizing $NO_x$ gas this is necessarily metered into the reaction medium since the reaction medium could not take up a large single one-shot introduction of the gas supply.

The temperature of the reaction medium during the introduction of the source of $NO_x$ can be maintained below 105° F by cooling. The reaction in accordance with the present invention is an overall exothermic reaction and as a result there is a natural tendency for the temperature of the reaction medium to rise due to the erosion or dissolution of the aluminum. In accordance with a preferred embodiment of the present invention, the temperature of the reaction medium can be maintained below 105° F during introduction of the source of $NO_x$ simply by limiting the amount of activated aluminum originally present in the reaction medium.

The aluminum containing reaction products of the present invention generally contain from about 3 to about 15, preferably about 3 to about 7 percent by weight of aluminum. Based upon an assumed reaction of 3 mols of $NO_x$ per mol of aluminum, the stoichiometric amount of aluminum required for complete reaction with the nitric acid or source of $NO_x$ can be easily determined. Accordingly, pursuant to this preferred embodiment of the present invention, to initiate the reaction, the activated aluminum is added to the aqueous reaction medium in an amount less than such predetermined stoichiometric amount based on the desired final aluminum content of the reaction product. The desirable range or amount of aluminum which will effectively maintain the temperature of the reaction medium below about 105° F during the introduction of the source of $NO_x$ can be easily determined through routine experimentation.

As indicated previously, the reaction between the source of $NO_x$ and activated aluminum is accompanied by an increase in the pH of the aqueous reaction system as the NO and/or $NO_2$ or $NO_3$— are converted to amino groups. Accordingly, in this preferred embodiment of the present invention, after the addition of the source of $NO_x$ and, preferably, when the pH of the aqueous reaction medium reaches at least about pH 3, additional activated aluminum is added to provide at least a stoichiometric amount of aluminum based on the final desired aluminum content of the reaction product. Generally, the aluminum is added at this point in an excess of the stoichiometric amount to ensure the desired degree of reaction. Since the reaction requires erosion or dissolution of the activated aluminum to proceed, withdrawal of any unreacted activated aluminum immediately terminates the reaction.

When this excess activated aluminum is added to the reaction medium, there is a tendency for the temperature of the reaction medium to increase due to the erosion and dissolution of the activated aluminum. An increase in temperature at this time, i.e., after the introduction of the source of $NO_x$ is quite acceptable and elevated temperatures can be effectively utilized during this stage of the reaction. However, the temperature should be maintained below the boiling point of the aqueous reaction medium in order to prevent the possible breakdown of the aluminum-containing reaction product through loss of ammonia. It should be readily apparent that there is no lower limit with respect to the temperature of the reaction medium as long as the temperature is not sufficiently low as to interfere with the mobility of the reactants during the reaction.

Formation of the aluminum containing reaction product of the present invention is accompanied by an increase in the specific gravity and viscosity of the reaction medium. Generally, the aqueous solution of the aluminum containing reaction product of the present invention has a specific gravity of from about 1.1 to 1.5. The specific gravity should not be allowed to go substantially above 1.5 since at higher specific gravities the unreacted activated aluminum tends to rise in and float upon the aqueous reaction medium. This could have deleterious effects upon the quality of the aluminum containing reaction product since when the activated aluminum is in contact with the atmosphere, by-products tend to form and there is a hydrogen deficiency and an increasing tendency for the second metal, e.g., mercury, to be "squeezed out" of the activated aluminum and enter the aluminum-containing complex product. Accordingly, the reaction is maintained through contact between the activated aluminum and reaction medium containing the source of $NO_x$ until the specific gravity of such reaction medium is within the range of about 1.1 to 1.5. Again, termination of the reaction is achieved by withdrawal of any unreacted activated aluminum from the aqueous reaction medium, this being achieved before the specific gravity exceeds about 1.5 and before the pH of the aqueous reaction medium exceeds about pH 4.5.

As indicated above, a unique characteristic of the activated aluminum is its ability to release hydrogen ions or protons when placed in a hydrogen ion donating medium, such as water. This characteristic is taken advantage of in the process of the present invention. In this respect, the process of the present invention is carried out in a manner to minimize the nitrate formation and maximize the formation of amino groups, in the form of NH groups, $NH_2$ groups and $NH_3$ groups. These highly active groups are formed in the process of the present invention through the reaction between the $NO_x$ groups and active hydrogen ions or protons released during erosion or dissolution of the aluminum metal from the activated aluminum. These amino groups are apparently tied up by the aluminum present in the aqueous reaction medium, thereby effectively establishing the aluminum containing complex product. In addition, hydroperoxy groups will be formed from the conversion of the $NO_x$ to the amino groups and the breaking up of water by the activated aluminum. Accordingly, the aluminum containing complex product will contain aluminum, hydroperoxy groups, amino groups, as well as minor amounts of nitrate groups and possibly minor amounts of nitrite, nitride and hydroxy groups formed during this complex reaction. The type and amount of functional groups present in the aluminum containing complex product will depend upon several factors, the most notable of which is the final pH or the pH during which the reaction product is removed from the reaction system.

It has been determined in accordance with the present invention that a low pH, i.e., a pH up to about 3.5, a complex product is formed having predominant functional groups different from those formed at a higher pH, e.g., a pH above 3.5 to 4.0.

In the lower pH range, up to about pH 3.5, the process of the present invention proceeds through at least partial conversion of the $NO_x$ to amino groups through the contact and reaction with the activated form of aluminum and substantial quantities of hydroperoxy groups are formed. Accordingly, when the reaction is carried out at a pH below about 3.5 the complex product predominates in NH, $NH_2$ and/or $NH_3$ groups and hydroperoxy groups, particularly in the pH range of 2.5 to 3.5. Also, more nitrate will be formed in this lower pH range.

After the activated form of aluminum has reacted with the source of $NO_x$ sufficiently to raise the pH of the reaction medium to a value greater than about 3.5, there is thereafter a lesser tendency for the formation of hydroperoxy groups with a great decrease in nitrate group formation. Also there is some decrease in NH and $NH_2$ groups with an increase in $NH_3$ groups. It is important to note, however, that if the reaction is permitted to reach pH levels above about 4.4 to 4.5 there will be a deterioration in the structure of the complex product. Little or no hydroperoxy groups are formed after a pH of about 4.0–4.2 is reached and above about 4.2 there is little nitrate formation. This is due primarily to the formation of ammonia. At pH levels above about 4.4–4.5, ammonia is actually lost from the complex polymeric product, itself, with the result that an aluminum oxide-aluminum hydroxide complex precipitates. Accordingly, as indicated above, the reaction of the present invention is terminated before the pH of the reaction medium exceeds about pH 4.5.

The process of the present invention can be terminated at any stage during the reaction in order to prepare an aluminum containing complex product which predominates in one or more of the functional groups described above. Again, this is simply done by removing any unreacted reactive aluminum from the aqueous reaction medium. Generally, however, the reaction is carried out for a substantially long period of time so that a substantial amount of aluminum containing complex product is formed in the reaction medium. This is evidenced by the viscosity and the specific gravity of the reaction medium increasing, with a minimum specific gravity being about 1.1. Preferably the reaction is continued until the specific gravity of the aqueous reaction medium is within the range of about 1.3 to 1.4. Also, as previously indicated, termination must be effected before the pH of the reaction medium exceeds about pH 4.5 and the specific gravity exceeds about 1.5.

While no structural formula has been developed for the aluminum-containing complex product of the present invention, the following gross analysis has been developed based upon the functional groups analyzed to be present in the reaction product:

| GROUP | | |
|---|---|---|
| aluminum | | about 3–15% |
| total nitrogen | ammonium, (amino and nitrate) | about 8–16% |
| hydroperoxy ($HO_2$) | | about 0.02–26% |
| nitrate | | about 1–7% |
| Hydroxy | | Trace |
| Nitrite | | Trace |
| Nitride | | Trace |
| Water | | Balance |

As indicated previously the reaction of the present invention is carried out to minimize nitrate content while maximizing the hydroperoxy and amino group content of the reaction product. In addition, as between the predominance of hydroperoxy and amino groups in the aluminum-containing reaction product, this can be achieved by carrying out the reaction or terminating the reaction at a specified low or high pH within the range of 1.5 to 4.5. Lower pH values, of course, should be avoided since these tend to increase the nitrate content of the reaction product.

The nitride content of the product is increased somewhat if the reaction is driven beyond typical completion, such as by the addition of heat or additional aluminum after the formation of a viscous reaction medium. This tendency toward aluminum nitride formation, however, is not deleterious since the presence of some nitride in a fertilizer or detergent product is desirable for some purposes.

It will be noted from the above that even without the addition of a further source of active oxygen the complex product produced by the process of the present invention contains active oxygen in the form of hydroperoxy groups and some nitrate groups formed during the reaction. Where desired, however, a fertilizer product or detergent product having even more active oxygen may be formed by reacting the complex product described above with a source of hydroperoxy groups such as, for example, hydrogen peroxide or ozone. In a typical reaction, a 30–70% hydrogen peroxide solution can be added to the complex product described above and reacted for a short time, e.g., about 30–60 minutes to yield this hydroperoxy enriched product. A typical ratio of reactants would be approximately 100 ml of the mother liquor of the above reaction mixed with 10–100 ml of the hydrogen peroxide solution. In this reaction it is preferred to cool the reactants to avoid the breakdown of hydrogen peroxide through an exothermic reaction. Preferably, the reactants are not agitated.

A further modification of the process of the present invention involves neutralization or stabilization of the complex product by reaction with ammonia, with or without prior hydroperoxy enrichment through reaction with hydrogen peroxide. Generally, the addition of 5% to 30% by weight of ammonia is effective for this purpose. The ammonia becomes bound to the complex product and after the reaction has proceeded for some time no odor of ammonia can be detected.

Still further, in producing a product having soap characteristics, the complex product formed by the reaction between the activated form of aluminum and nitric acid can be further reacted with a fatty acid, specifically a saturated fatty carboxylic acid. Examples of typical saturated fatty carboxylic acids include, for example, oleic acid, stearic acid, palmitic acid, lauric acid, etc. This reaction with a saturated fatty carboxylic acid is carried out by simply contacting the mother liquor formed by reaction between the activated form of alumium and source of $NO_x$ with the desired fatty acid. This can be carried out with or without prior or concurrent reaction with hydrogen peroxide. This product has both bleach and soap characteristics.

As indicated above, instead of using nitric acid as a reactant, the process of the present invention can be effectively and efficiently carried out utilizing an $NO_x$ gas, such as the $NO_x$ containing flue gas of a nitric acid plant. This, therefore, allows such gas, which is generally vented to the atmosphere and becomes an atmospheric pollutant, to be efficiently utilized in the production of a commerical product. The reaction between the $NO_x$ gas and activated form of aluminum in the aqueous medium proceeds substantially in the same manner as the reaction with nitric acid, i.e., the conversion to amino groups with reaction with hydrogen ions generated by the activated alumium, with the additional comment that care should be taken to provide adequate contact between the $NO_x$ gas and activated form of aluminum. This merely requires that the system be arranged mechanically to provide suitable contact between the gas bubbles and alumium metal present in the reaction medium.

The complex products produced by the process of the present invention are produced as aqueous solutions. Such products can be effectively used as fertilizer or as a bleach and soap compositions in such liquid form or can be conveniently converted to solid particulate form by evaporation of the liquid medium, such as by spray drying. In addition, however, it has been found in accordance with the present invention that a solid particulate product is formed when the acidic complex product, with or without hydroperoxy enrichment is stabilized and neutralized by reaction with ammonia. Accordingly, a powdered product can be formed which can be utilized as an effective fertilizer, bleach, etc., simply by contacting and reacting the mother liquor of the reaction with ammonia, with or without previous hydroperoxy enrichment. This is an effective way of providing a neutralized product and one in which the product is in a powdered form.

Variations in the composition of the complex product produced by the process of the present invention can be achieved by varying certain parameters, particularly the concentration of nitric acid, etc. For example, the use of dilute nitric acid tends to increase the amine group content. Furthermore, the aluminum content in the complex product can be increased by continued reaction of the activated aluminum after the complex product has been formed. In addition, as noted above, the pH of the reaction medium tends to control to some extent the content of functional groups present in the complex product which is formed. The following Table 1 sets forth in percentages by weight analyses of several products prepared through the process of the present invention.

TABLE 1

| | Aluminum | Ammoniacal Nitrogen | $NH_2$ Nitrogen | Nitrate Nitrogen | Nitrite Nitrogen | Oxygen as Peroxide |
|---|---|---|---|---|---|---|
| A | 6.60% | 4.40% | 0.60% | 5.3% | 0.50% | 0.054% |
| B | 4.69 | 4.14 | 0.93 | 5.7 | <0.02 | 0.088 |
| C | 5.63 | 4.89 | 3.18 | 1.9 | <0.02 | 0.20 |
| D | 6.53 | Not Analyzed | | 3.5 | <0.02 | 0.08 |
| E | 5.40 | 3.55 | <0.01 | 5.9 | <0.02 | 0.11 |
| F | 5.03 | 3.43 | <0.01 | 6.2 | <0.02 | 12.60 |

Figure 2:
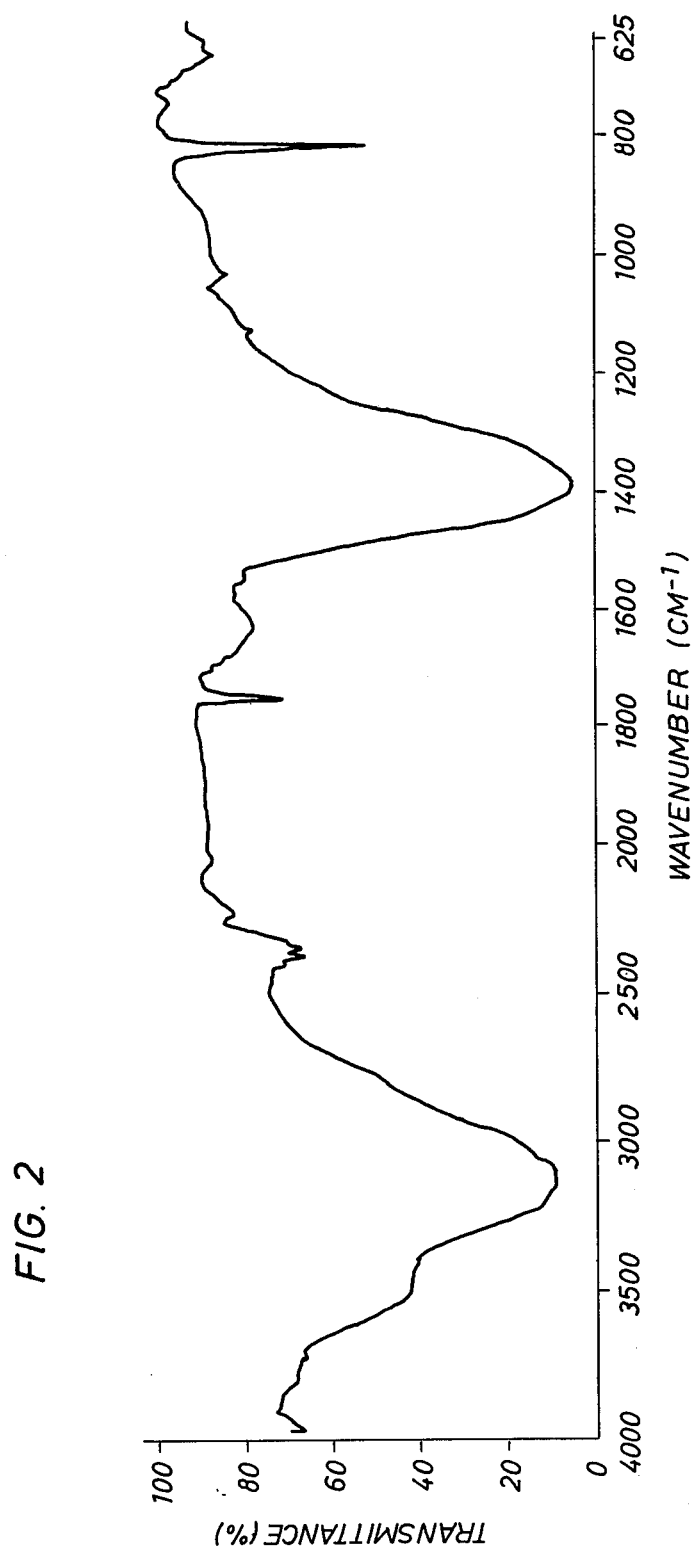
FIG. 2 is an infrared spectrum of a complex product in accordance with the present invention, withdrawn from the reaction system at a pH of about 2.8.

FIGS. 1 and 2 are infrared scans of two products illustrated in Table 1, namely products C and F respectively. In connection with the product of FIG. 1, the pH of the final product was 4.2; the pH of the product of FIG. 2, was 2.8. The peaks at approximately 3,100 cm-1 and 1,900 cm-1 are associated with the amino (NH and $NH_2$) groups and $NH_3$ groups. The peak at approximately 1,400 cm-1 is associated with the nitrate group, while that at approximately 825 cm-1 is associated with the hydroperoxy group. It can be seen by comparing FIGS. 1 and 2 that they correlate directly to the analysis in Table 1 and that the nitrate group diminishes greatly as the pH of the reaction medium is increased. In addition, the infrared scans illustrate that the amino group content of the aluminum-containing reaction product increases as the pH of the reaction product increases, but not to the same degree as the nitrate group. Also, at pH 4.2 the point has already been reached where hydroperoxy group content tends to be decreased due to the increased amino content.

The process and products of the present invention will now be described by reference to the following specific examples. It should be understood that such examples are presented for purposes of illustration only, and the present invention can not under any circumstances be deemed limited thereto. Unless otherwise specified, in the following examples all percentages and parts are by weight.

EXAMPLE 1

A complex product in accordance with the present invention is prepared by gradually combining 100 g of concentrated nitric acid with 100 g of water and reacting the diluted nitric acid with a 10 g rod of activated aluminum prepared with mercury and having a mercury content of approximately 3% by weight. The reaction is water cooled to maintain the temperature below 105° F. The reaction is permitted to continue until the pH is at least about 4.0. The mother liquor is decanted to obtain the complex product.

EXAMPLE 2

Some 100 ml of the mother liquor obtained from Example 1 are combined with 20 ml of hydrogen peroxide having a concentration of 50% and permitted to react for 30–60 minutes. The reaction medium is not agitated and cooling is provided to avoid the breakdown of the concentrated hydrogen peroxide. The resulting complex product is hydroperoxy enriched.

EXAMPLE 3

The hydroperoxy enriched complex product of Example 2 is combined with 5 to 10 ml of ammonia to stabilize the peroxy groups and to enrich the complex product with additional amino and ammoniacal nitrogen groups.

EXAMPLE 4

The mother liquor of Example 1 is decanted off and 10 g of lauric acid are added to 100 ml of the mother liquor. The resulting complex product has both bleach and soap characteristics.

EXAMPLE 5

A complex product having a relatively low $NH_x$ content is prepared by reacting 200 ml of water and 20 ml of concentrated nitric acid with an activated aluminum rod of about 100 g and removing the aluminum rod when the pH reaches about 3.5.

EXAMPLE 6

A complex product is prepared by placing a 100 g activated aluminum rod under water and introducing $NO_x$ gas into the water so that the bubbles contact the activated aluminum. The reactants are occasionally mixed in order to promote the interreaction between the various ancillary chemical compounds formed.

EXAMPLE 7

Example 6 is repeated except that aqueous ethyl alcohol is used instead of water.

EXAMPLE 8

Example 6 is repeated except that aqueous methyl alcohol is used instead of water.

EXAMPLE 9

An aluminum-containing complex product was produced in accordance with the present invention by reacting 2,000 grams of water containing 2,000 grams of nitric acid (70%) with aluminum activated with mercury to the extent of about 3% by weight. The reaction was carried out in accordance with the following sequence.

The 2,000 grams of water were added to a reaction vessel followed by 81 grams of activated aluminum in the form of small rods. The nitric acid was then introduced slowly into the reaction vessel, maintaining a temperature of 29°–32° C. The nitric acid was introduced incrementally with approximately 10% of the nitric acid being added with each addition. This amounted to 139.86 mm of the nitric acid. After the addition of the nitric acid, the temperature of the reaction system was 32.5° C. At this point an additional 27.3 g of the activated aluminum were added. Approximately 24 hours later an additional 54.6 g of the activated aluminum were added, the temperature at the time of addition being 23° C. The temperature of the reaction system quickly rose to 28° C.

The reaction was allowed to sit for approximately 72 hours during which the reaction continued with an increase in specific gravity of the reaction medium. After approximately 72 hours an additional 26.8 g of the activated aluminum were added. Approximately 30 hours later the action was terminated by removing the unreacted activated aluminum.

The final specific gravity of the reaction system was 1.33. A total of 188.7 g of activated aluminum were added to the reaction system and 32.2 g were removed upon termination of the reaction. Accordingly, 156.6 g of aluminum entered into the complex product.

While the present invention has been described primarily with respect to preferred embodiments of the present invention, it should be understood that many variations can be carried out while remaining within the true scope and spirit of the invention. Accordingly, the present invention cannot in any way be deemed limited to the preferred embodiments above.

What is claimed is:

1. A process for producing an aluminum containing reaction product which comprises:
   reactively contacting in an aqueous medium
   a. activated aluminum comprising aluminum metal, at least 99.9% by weight pure, which has been permeated with from about 0.1% to about 5.0% by weight of mercury; and
   b. a source of $NO_x$;
   said process being carried out according to the following sequence:
   i. adding said activated aluminum to said aqueous reaction medium;
   iii. adding said source of $NO_x$ to said aqueous reaction medium in an amount to establish a pH in said aqueous reaction medium of at least about 1.5 and at a rate to maintain the temperature of said aqueous reaction medium below about 105° F during addition of said source of $NO_x$, the reaction of said source of $NO_x$ with the aluminum in said aqueous reaction medium being accompanied by an increase in the pH of said aqueous reaction medium;
   iii. continuing the reaction while maintaining the temperature below the boiling point of the aqueous reaction medium until the specific gravity of the aqueous reaction medium is within the range of about 1.1 to 1.5; and
   iv. terminating the reaction by withdrawal of any unreacted activated aluminum from the aqueous reaction medium before the specific gravity of said aqueous reaction medium exceeds about 1.5 and before the pH of the aqueous reaction medium exceeds about pH 4.5.

2. The process of claim 1 wherein said source of $NO_x$ is $NO_x$ gas.

3. The process of claim 1 wherein said source of $NO_x$ is nitric acid.

4. The process of claim 1 further comprising: contacting and reacting the product, after removal of any unreacted aluminum, with ammonia.

5. The process of claim 1 further comprising: contacting and reacting the product, after removal of any unreacted aluminum, with hydrogen peroxide.

6. The process of claim 1 further comprising: contacting and reacting the product, after removal of any unreacted aluminum, with a saturated fatty acid.

7. The process of claim 1 further comprising: drying the product after removal of any unreacted aluminum.

8. A process for producing an aluminum containing reaction product which comprises:
   reactively contacting in an aqueous medium a. activated aluminum comprising aluminum metal, at least 99.9% by weight pure, which has been permeated with from about 0.01% to about 3.0% by weight of gallium or an indium/gallium alloy; and b. a source of $NO_x$; said process being carried out according to the following sequence:

i. adding said activated aluminum to said aqueous reaction medium;

ii. adding said source of $NO_x$ to said aqueous reaction medium in an amount to establish a pH in said aqueous reaction medium of at least about 1.5 and at a rate to maintain the temperature of said aqueous reaction medium below about 105° F during addition of said source of $NO_x$, the reaction of said source of $NO_x$ with the aluminum in said aqueous reaction medium being accompanied by an increase in the pH of said aqueous reaction medium;

iii. continuing the reaction while maintaining the temperature below the boiling point of the aqueous reaction medium until the specific gravity of the aqueous reaction medium is within the range of about 1.1 to 1.5; and iv. terminating the reaction by withdrawal of an unreacted activated aluminum from the aqueous reaction medium before the specific gravity of said aqueous reaction medium exceeds about 1.5 and before the pH of the aqueous reaction medium exceeds about pH 4.5.

9. The process of claim 8 wherein said source of $NO_x$ is $NO_x$ gas.

10. The process of claim 8 wherein said source of $NO_x$ is nitric acid.

11. The process of claim 8 further comprising: contacting and reacting the product, after removal of any unreacted aluminum, with ammonia.

12. The process of claim 8 further comprising: contacting and reacting the product, after removal of any unreacted aluminum, with hydrogen peroxide.

13. The process of claim 8 further comprising: contacting and reacting the product, after removal of any unreacted aluminum, with a saturated fatty acid.

14. The process of claim 8 further comprising: drying the product after removal of any unreacted aluminum.

15. A process for producing an aluminum containing reaction product which comprises:

reactively contacting in an aqueous medium a. activated aluminum comprising aluminum metal, at least 99.9% by weight pure, which has been permeated with from about 0.1% to about 5.0% by weight of mercury; and b. a source of $NO_x$; said process being carried out according to the following sequence:

i. adding said activated aluminum to said aqueous reaction medium in an amount less than a predetermined stoichiometric amount based on a final desired aluminum content in the reaction product of at least about 3% by weight;

ii. adding said source of $NO_x$ to said aqueous reaction medium in an amount to establish a pH in said aqueous reaction medium of at least about 1.5 and at a rate to maintain the temperature of said aqueous reaction medium below about 105° F during addition of said source of $NO_x$, the reaction of said source of $NO_x$ with the aluminum in said aqueous reaction medium being accompanied by an increase in the pH of said aqueous reaction medium;

iii. when the pH of said aqueous reaction medium reaches at least about pH 3, adding additional activated aluminum to provide at least a stoichiometric amount of aluminum based on the final desired aluminum content in the reaction product;

iv. continuing the reaction while maintaining the temperature below the boiling point of the aqueous reaction medium until the specific gravity of the aqueous reaction medium is within the range of about 1.1 to 1.5; and v. terminating the reaction by withdrawal of any unreacted activated aluminum from the aqueous reaction medium before the specific gravity of said aqueous reaction medium exceeds about 1.5 and before the pH of the aqueous reaction medium exceeds about pH 4.5.

16. A process for producing an aluminum containing reaction product which comprises:

reactively contacting in an aqueous medium a. activated aluminum comprising aluminum metal, at least 99.9% by weight pure, which has been permeated with from about 0.01% to about 3.0% by weight of gallium or an indium/gallium alloy; and b. a source of $NO_x$;

said process being carried out according to the following sequence:

i. adding said activated aluminum to said aqueous reaction medium in an amount less than a predetermined stoichiometric amount based on a final desired aluminum content in the reaction product of at least about 3% by weight;

ii. adding said source of $NO_x$ to said aqueous reaction medium in an amount to establish a pH in said aqueous reaction medium of at least about 1.5 and at a rate to maintain the temperature of said aqueous reaction medium below about 105° F during addition of said source of $NO_x$, the reaction of said source of $NO_x$ with the aluminum in said aqueous reaction medium being accompanied by an increase in the pH of said aqueous reaction medium;

iii. when the pH of said aqueous reaction medium reaches at least about pH 3, adding additional activated aluminum to provide at least a stoichiometric amount of aluminum based on the final desired aluminum content in the reaction product;

iv. continuing the reaction while maintaining the temperature below the boiling point of the aqueous reaction medium until the specific gravity of the aqueous reaction medium is within the range of about 1.1 to 1.5; and v. terminating the reaction by withdrawal of any unreacted activated aluminum from the aqueous reaction medium before the specific gravity of said aqueous reaction medium exceeds about 1.5 and before the pH of the aqueous reaction medium exceeds about pH 4.5.

17. The complex product obtained by the process of claim 1.

18. The complex product obtained by the process of claim 4.

19. The complex product obtained by the process of claim 5.

20. The complex product obtained by the process of claim 6.

21. The dried complex product obtained by the process of claim 7.

22. The complex product obtained by the process of claim 8.

23. The complex product obtained by the process of claim 11.

24. The complex product obtained by the process of claim 12.

25. The complex product obtained by the process of claim 13.

26. The dried complex product obtained by the process of claim 14.

* * * * *

UNITED STATES PATENT OFFICE
CERTIFICATE OF CORRECTION

Patent No. 4017591     Dated Apr. 12, 1977

Inventor(s) George G. Merkl

It is certified that error appears in the above-identified patent and that said Letters Patent are hereby corrected as shown below:

Column 14, line 7, delete "156.6 g" and insert therefor -- 156.5 g --;

In the claims:

Claim 1, column 14, line 29, delete "iii." and insert therefor -- ii. -- .

Signed and Sealed this

*Fifteenth* Day of *November 1977*

[SEAL]

Attest:

RUTH C. MASON      LUTRELLE F. PARKER
*Attesting Officer*     *Acting Commissioner of Patents and Trademarks*